(No Model.)
G. S. IREDELL.
LUNCH HEATER.
No. 295,400.  Patented Mar. 18, 1884.
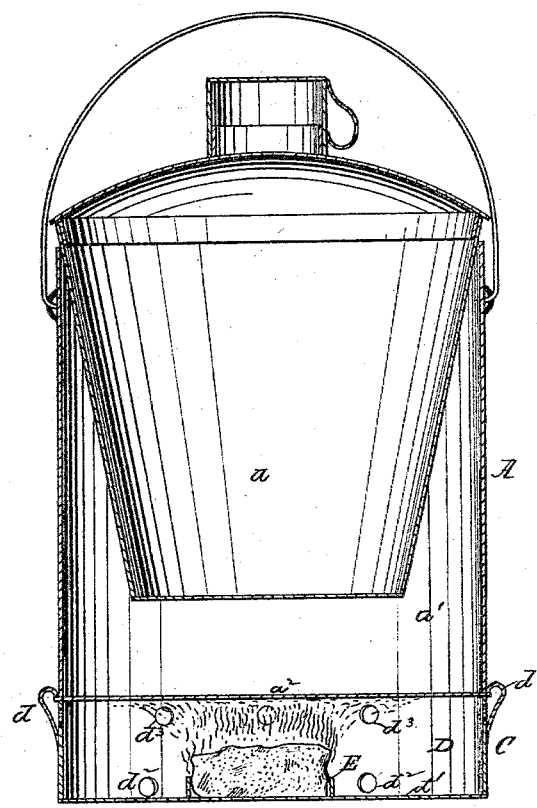
Witnesses:
Wm. H. Powell
Jos. B. Connolly
Inventor
George S. Iredell,
By Connolly Bros
Attys

UNITED STATES PATENT OFFICE.

GEORGE S. IREDELL, OF PHILADELPHIA, PENNSYLVANIA.

LUNCH-HEATER.

SPECIFICATION forming part of Letters Patent No. 295,400, dated March 18, 1884.

Application filed June 12, 1883. (No model.)

*To all whom it may concern:*

Be it known that I, GEORGE S. IREDELL, a citizen of the United States, residing at Philadelphia, in the county of Philadelphia and State of Pennsylvania, have invented certain new and useful Improvements in Dinner Pails or Kettles; and I do hereby declare the following to be a full, clear, and exact description of the invention, reference being had to the accompanying drawings, which form part of this specification, in which the figure is a vertical section of a dinner pail or kettle embodying my improvement.

My invention has for its object to provide means for warming the contents of a dinner-pail, particularly the fluid portion—such as tea, coffee, &c.; and my improvements consist in the combination, with a dinner-pail, of a lamp of peculiar construction, as hereinafter fully described.

Referring to the accompanying drawings, A represents a dinner-pail of the usual or any suitable construction. As ordinarily constructed, these pails or kettles are formed with a central compartment or well, $a$, for the reception of solid food, and beneath and around this compartment a chamber, $a'$, for the reception of fluid refreshment—such as tea or coffee—which consumers generally prefer to have heated for imbibition, the means for which are generally or frequently found wanting.

C represents an attachment which may be constructed at slight expense and readily attached to the pail A without impairing the symmetry or considerably increasing the weight of said vessel, and which will afford ready and convenient means for applying caloric to the fluid contents of said vessel when the convenience of a stove or equivalent culinary fixture is not obtainable. This device consists of a cylindrical shell or pan, D, of about the same diameter as the pail A, and provided with spring-catches $d\ d$, two or more, which pass up over the edge of the bottom $a^2$ of said pail, or over a wire rim or other equivalent shoulder, for the purpose of securing said pan firmly yet detachably to the pail and beneath the bottom of the latter.

Resting upon the bottom $d'$ of the pan D is a lamp, E, of any suitable size and construction for the purpose. I prefer to make it only large enough to hold a supply of heating-fluid, (alcohol or hydrocarbon, for example,) and a wick or equivalent sufficient for a single heating of the contents of chamber $a'$ to a temperature suitable for drinking purposes. I prefer also to employ as a substitute for a common fibrous wick some incombustible but porous material—such as pumice-stone or prepared asbestus—which will absorb the heating-fluid, or which may be saturated therewith, and which will enable such fluid to be consumed without itself suffering destruction. By this means spilling or waste of the heating-fluid is avoided in carrying the pail, while the danger of serious conflagration is also averted.

To afford inlet for fresh air to support combustion and egress for the vitiated air and gases, the side walls of the pan are perforated at $d^2\ d^3$, said walls being otherwise left closed to avoid permitting the escape of the flame from the lamp to blacken the sides of the pail or set fire to the surroundings.

I am aware that it is not new to provide a vessel intended to contain a liquid substance with a removable lamp upon which the vessel rests when the contents are to be heated.

I am also aware that it is not new to provide a dinner-pail with a lamp which may be attached to the bottom of said pail by spring-clamps. In my invention the lamp is provided with spring-clamps, which secure it to the vessel, and is also provided with an external wall having openings for the admission of air, and openings for the escape of the products of combustion, thereby rendering it possible to carry the vessel around while the contents are being heated without danger of extinguishing the flame of the lamp.

What I claim as my invention is—

A heating attachment for dinner-kettles and similar vessels, comprising a lamp having a central burner and external surrounding walls, having two series of openings, one for the admission of air to support combustion and the other higher up for the escape of the products of combustion, said walls having attached to them upwardly-extending spring-clamps or spring-jaws, whereby the kettle or vessel to be heated is supported directly on the external walls of the lamp and clamped thereto by the spring-jaws, which latter hold the lamp below the kettle when the latter is being carried, said walls also serving to protect the exterior of the vessel from contact with the flames, substantially as specified and shown.

In testimony that I claim the foregoing I have hereunto set my hand this 6th day of June, 1883.

GEO. S. IREDELL.

Witnesses:
ANDREW ZANE, Jr.,
WM. H. POWELL.